US005544166A

United States Patent [19]

Neigard et al.

[11] Patent Number: 5,544,166
[45] Date of Patent: Aug. 6, 1996

[54] ELECTRICAL CIRCUIT ARRANGEMENT HAVING AT LEAST TWO LOCAL TRANSMITTING UNITS FOR RECEIVING AND CODING LOCAL MEASURING SIGNALS AND FOR TRANSMITTING THE CODED MEASURING SIGNALS TO A CENTRAL UNIT

[75] Inventors: Jens Neigard; Ole Skovgaard; Kent Soerensen, all of Hadsten, Denmark

[73] Assignee: Carlo Gavazzi AG, Switzerland

[21] Appl. No.: 440,309

[22] Filed: Mar. 28, 1995

[30] Foreign Application Priority Data

Apr. 19, 1994 [DE] Germany .......................... 44 13 566.1

[51] Int. Cl.[6] .................................. H04J 1/16; H04J 3/14

[52] U.S. Cl. ...................... 370/13; 340/825.06; 370/85.7

[58] Field of Search ............................... 370/14, 94.1, 13, 370/29, 16.1, 58.1, 58.2, 24, 17, 28, 85.1, 95.1, 18, 85.7; 340/825.06, 825.07, 825.08; 341/141

[56] References Cited

U.S. PATENT DOCUMENTS

| | | | |
|---|---|---|---|
| 3,761,878 | 9/1973 | Georget et al. | 340/150 |
| 4,023,139 | 5/1977 | Samburg | 340/147 |
| 4,672,374 | 6/1987 | Desjardins | 340/825.06 |
| 5,196,823 | 3/1993 | Formigoni | 340/310 |

FOREIGN PATENT DOCUMENTS

| | | |
|---|---|---|
| 0316946 | 12/1989 | European Pat. Off. . |
| 2232450 | 12/1973 | Germany . |
| 2317851 | 10/1974 | Germany . |
| 3739725 | 11/1987 | Germany . |
| 2022371 | 3/1979 | United Kingdom . |

*Primary Examiner*—Melvin Marcelo
*Assistant Examiner*—Melissa Kay Carman
*Attorney, Agent, or Firm*—Nields & Lemack

[57] ABSTRACT

The present invention relates to an electrical circuit arrangement having at least two local transmitting units (2) for receiving and coding local measuring signals and for transmitting the coded measuring signals to a central unit (1), which local transmitting units (2) respectively have a comparator (12) for comparing the local measuring signal with a reference value and trigger (13) for generating a binary signal to be transmitted to the central unit (1). In order to achieve reliable and central control of the reference value which is as simple as possible in conjunction with simultaneous reception, transmission and processing of a plurality of measured values not necessarily independent of one another, it is provided that the central unit (1) has a multiplex channel generator (4), control for fixing the reference value and multiplex receiver means (5, 6, 7, 8) for receiving and processing the binary signals transmitted by the local transmitting units (2), and that the local transmitting units (2) respectively have processor (9, 10, 11) for processing the reference value fixed by the control and multiplex transmitter (14) for transmitting the binary signal generated by the trigger (13) to the multiplex receiver (5, 6, 7, 8) of the central unit (1).

9 Claims, 5 Drawing Sheets

ELECTRICAL CIRCUIT ARRANGEMENT HAVING AT LEAST TWO LOCAL TRANSMITTING UNITS FOR RECEIVING AND CODING LOCAL MEASURING SIGNALS AND FOR TRANSMITTING THE CODED MEASURING SIGNALS TO A CENTRAL UNIT

BACKGROUND OF THE INVENTION

The present invention relates to an electrical circuit arrangement having at least two local transmitting units for receiving and coding local measuring signals and for transmitting the coded measuring signals to a central unit, which local transmitting units respectively have a comparator for comparing the local measuring signal with a reference value and triggering means for generating a binary signal to be transmitted to the central unit.

The technical literature discloses a multiplicity of electrical circuit arrangements which are used to receive, transmit and evaluate local measuring signals. Also belonging, inter alia, to the methods which are considered in this case to be prior art is transmission by means of binary signals, the level of the local measuring signal being represented by the relative frequency of the occurrence of two signal states "1" and "0" of the binary signals. For this purpose, the signal to be measured is compared with the reference value at specific, mostly equidistant instants, and one of the two signal states, that is to say "1" or "0", is output, depending on the result of this comparison.

There has always been a substantial problem in this case of undertaking a reliable and central control of the reference value which is as simple as possible. This is seen to be decidedly difficult, in particular, when the aim is simultaneously to record and process a plurality of different local measuring signals.

Furthermore, an exact determination of the local measuring signal which is to be determined requires an exact stochastic uniform distribution of the reference values. For this purpose, use is frequently made in the electrical circuit arrangements according to the prior art of an ergodic or stochastic random-check generator. It is to be regarded as a serious disadvantage in this case that such extremely complicated devices can be controlled only with difficulty. Furthermore, when a random-check generator is used there is a need for a very large number of generated reference values in order to be able to assume the required uniform distribution of the reference values. This has the disadvantageous consequence, in particular, that recording the local measuring signals over a lengthy period is indispensable.

Electrical circuit arrangements known to date have these serious disadvantages in a more or less prominent fashion. An electrical circuit arrangement for transmitting and displaying physical quantities or signals, present in electric form, by means of binary pulse trains is disclosed in German Patent Specification 22 32 450. There is to be gathered from this printed publication an arrangement of at least one comparator which compares threshold values generated by at least one stochastic generator with the amplitudes of physical quantities or signals, and makes binary decisions on the basis of these comparisons for the purpose of forming the output values, these output values occurring in the form of a pulse train. Although the conversion of an analog measured value into a digital bit sequence in which the frequency of the occurrence of the signal state "1" is proportional to the analog measured value follows from this printed publication, no central and standard control of the reference value to which the analog measured value to be determined is to be referred is provided. Rather, in the case of a use of two circuit arrangements disclosed in this printed publication, and of the combination of these to form a new arrangement by means of a logic network, all that is to be realized is a binary intermediate form which is proportional to the linear mean value of the product of the two local measuring signals to be determined. This patent specification provides no possibility for the separate determination of the two local measured values independently of one another.

In addition to this not inconsiderable deficiency, the use, disclosed in this printed publication, of a stochastic generator shows up diverse problems. Thus, in the case of a simultaneous arrangement of a plurality of, or even very many circuit arrangements, it is not possible to avoid a multiplicity of expensive devices such as, for example, stochastic generators. The overall circuit becomes very expensive, difficult to grasp and complicated.

SUMMARY OF THE INVENTION

Starting from this, it is the object of the invention to improve these known electrical circuit arrangements in such a way that the control of the reference value is performed reliably and centrally in as simple a fashion as possible. In conjunction therewith, there is the further object of being able simultaneously to record, transmit and process a plurality of measured values which are not necessarily independent of one another.

According to the invention, this is achieved in an electrical circuit arrangement of the type mentioned at the beginning due to the fact that the central unit has a multiplex channel generator, control means for fixing the reference value and multiplex receiving means for receiving and processing the binary signals transmitted by the local transmitting units, and that the local transmitting units respectively have processing means for processing the reference value fixed by the control means and multiplex transmitting means for transmitting the binary signal generated by the triggering means to the multiplex receiving means of the central unit.

According to a particular inventive development, through connection to a multiplex two-wire line, the multiplex channel generator, which preferably has a clock generator and a pulse generator, is connected both to the multiplex receiving means of the central unit and to the local transmitting units, each of the local transmitting units having an address in the multiplex two-wire system. The use of the multiplex two-wire line guarantees simultaneous transmission to the central unit of all the measured data determined by the local transmitting units. Owing to the virtually unlimited possiblities of channel selection in the time-division multiplex method, it is possible in this way for virtually any arbitrary number of local transmitting units to be connected to the central unit, as a result of which, however, the traceability of the circuit is maintained at any time because of the use of the two-wire technique. Not least, in this case the use of the multiplex two-wire method guarantees the simultaneous and democratic provision and processing of the data arriving, which are supplied by the respective local transmitting units. Furthermore, in this context because of its very simple basic principle the multiplex two-wire technique permits the most varied and differing possibilities of use and application.

According to a further advantageous embodiment of the invention, the multiplex channel generator generates a pulse train whose pulses correspond to different transmitting time channels, and both the multiplex transmitting means and the multiplex receiving means have decoder means by means of which they are activated during at least one transmitting time channel assigned to them. As a result, the accurate transmission of the determined and digitized measured data from the multiplex transmitting means arranged in the local transmitting unit to the multiplex receiving means arranged in the central unit is accomplished. Owing to the identical arrangement of the decoder means both in the multiplex transmitting means and in the multiplex receiving means, a unique assignment of the data arriving from the respective local transmitting units to the corresponding receiving means in the central unit is ensured in this case, and this not only guarantees the desired transmission reliability, but also substantially increases the transmission rate.

According to a particular inventive development, the control means for fixing the reference value consist of a synchronization pulse generator generating a synchronization pulse, which preferably forms a structural unit with the multiplex channel generator. This one synchronization pulse per pulse train is received by all the local transmitting units connected to the central unit and simultaneously in this case in particular by the processing means, and this guarantees the simple and reliable mode of operation of the central control for fixing the reference value.

In this context, the processing means of the local transmitting units advantageously have a detector circuit, a counter and a digital/analog (D/A) converter.

According to a further preferred embodiment of the invention, the comparator in the respective local transmitting unit forms the respective differential value between the local measuring signal and the reference value. Depending on the sign of this differential value, in this case triggering means downstream of the comparator switch through (that is to say binary signal value "1"), or they block (that is to say, binary signal value "0"). This digitization, caused by the use of comparator and triggering means, of the measuring signals, which are analog, for example, proves to be decidedly advantageous, particularly with regard to the rate and reliability of data transmission, not least since in the case of digital data transmission the vulnerability and error frequency are substantially lower than in the case of the transmission of analog signals.

According to a preferred embodiment of the invention, the transmitting means of the local transmitting units have a multiplex transmitter which transmits the binary signals "1" or "0" supplied by the triggering means to the receiving means of the central unit. Consequently, according to a further preferred embodiment of the invention, the receiving means of the central unit have a multichannel-multiplex receiver, at least two counters and an evaluation circuit, one counter each being respectively assigned to a local transmitting unit. Owing to this arrangement, an optimum possibility of use is provided for the multiplex method, since the sequence of the individual pulse trains guarantees in the shortest possible time a simultaneous and error-free transmission of the local measuring signals of all the local transmitting units connected to the central unit.

According to a particular inventive development, the output terminal of the counter, arranged in each local transmitting unit, for the least significant bit (LSB) is connected to the input terminal of the D/A converter, likewise arranged in each local transmitting unit, for the most significant bit (MSB), and the output terminal of the counter for the second least significant bit is connected to the input terminal of the D/A converter for the second most significant bit etc. The achievement of this special arrangement is that the reference value fixed in the processing means is not, for example, constant or does not rise or fall monotonically, but fluctuates in a stochastically uniform distribution, and this could only be achieved to date through the use of complicated and expensive ergodic or stochastic generators. Thus, the interchange presented here of all the respectively opposing terminals, which although very simple is nevertheless highly effective, saves, in conjunction with the same effect, not only material but also, above all, substantial costs. Furthermore, it gives rise to the advantage of a palpable saving in time in conjunction with simultaneously substantially improved resolution of the local measuring signal, since significantly better statistics are achieved in the comparator arranged in each local transmitting unit even after the formation of relatively few differential values as a consequence of the fluctuations of the reference signal in the stochastically uniform distribution.

The invention is explained in more detail below with the aid of the exemplary embodiments represented diagrammatically in FIGS. 1 to 9, identical or similar parts being provided with identical reference symbols in the figures, in which:

DESCRIPTION OF THE PREFERRED EMBODIMENT

Figure 1:
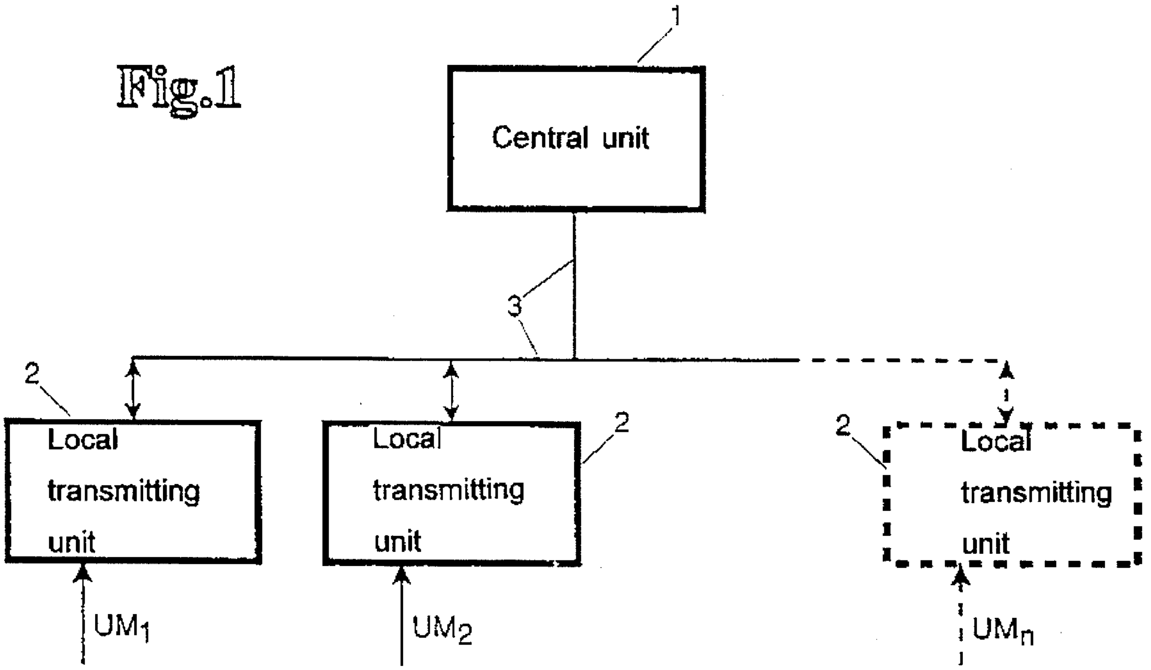
FIG. 1 shows a block diagram of an electrical circuit arrangement according to the invention.

An exemplary embodiment of an electrical circuit arrangement according to the invention is to be seen in FIG. 1. It has a central unit 1, which can be constructed, for example, in the form of a CPU (=central processing unit) and to which n local transmitting units 2 are connected by means of a multiplex two-wire line 3, it being the case that $n \geqq 2$ holds. Each of these n local transmitting units 2 is fed a local, for example analog measuring signal. $UM_1$, $UM_2$, . . . , $UM_n$. As also in the following FIGS. 2 to 9, it is not shown in FIG. 1 that the multiplex two-wire line 3 consists of two wires; thus, for reasons of simplicity and ease of understanding, the multiplex two-wire line 3 in FIGS. 1 to 9 is marked by one line.

Figure 2:
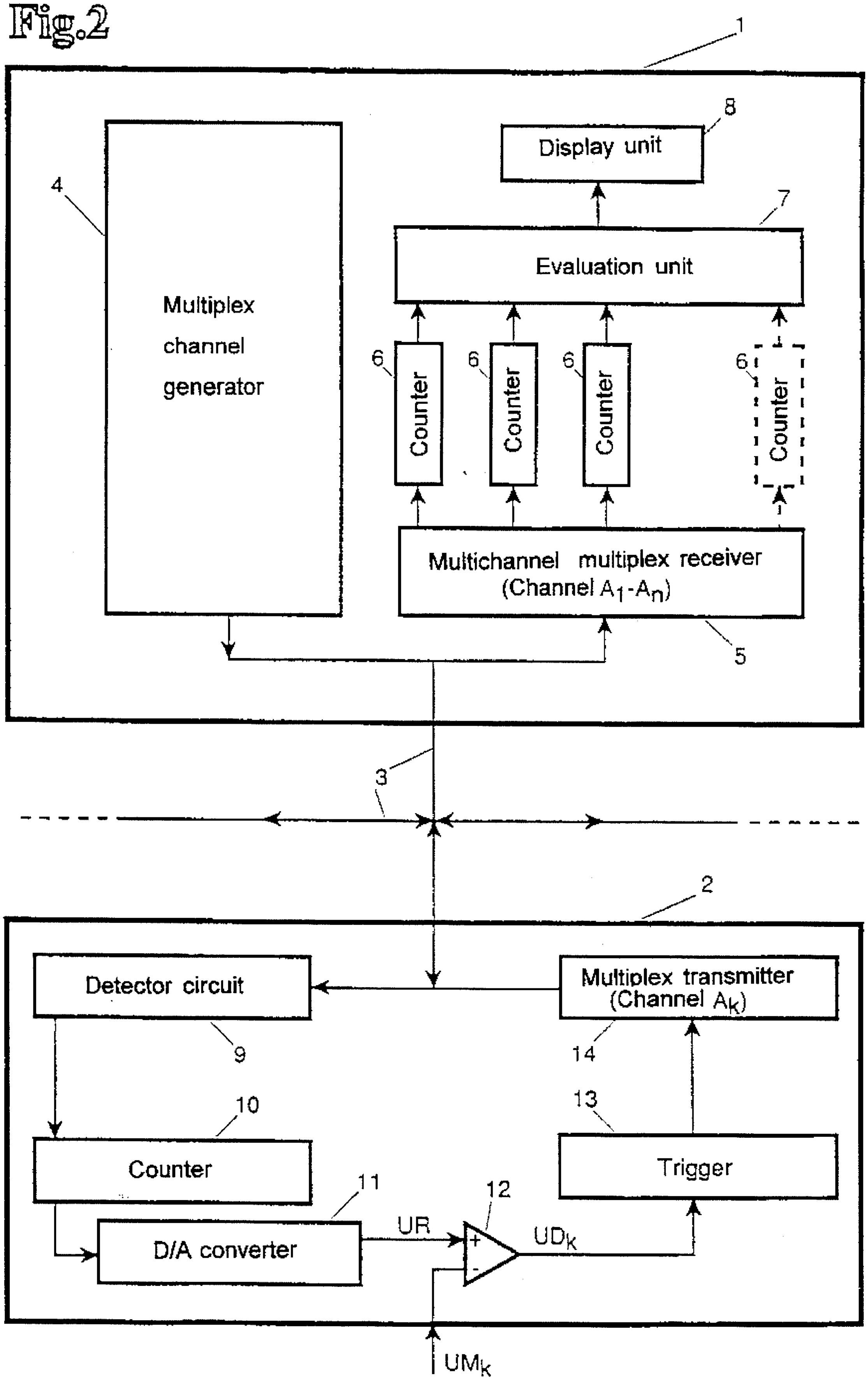
FIG. 2 shows a section of a block diagram of an electrical circuit arrangement according to the invention.

FIG. 2 shows a section of a block diagram of an electrical circuit arrangement according to the invention. The central unit 1 and one of a plurality of local transmitting units 2 which are connected to one another by the multiplex two-wire line 3 are represented. The central unit 1 has a multiplex channel generator 4. Furthermore, the central unit 1 comprises a multichannel multiplex receiver 5, a counter 6 and an evaluation circuit which in the present exemplary embodiment consists of an evaluation unit 7 and a display unit 8. The local transmitting unit 2 likewise shown in FIG. 2 has a detector circuit 9, a counter 10, a digital/analog (D/A) converter 11, a comparator 12, a trigger 13 and a multiplex transmitter 14.

Figure 3:
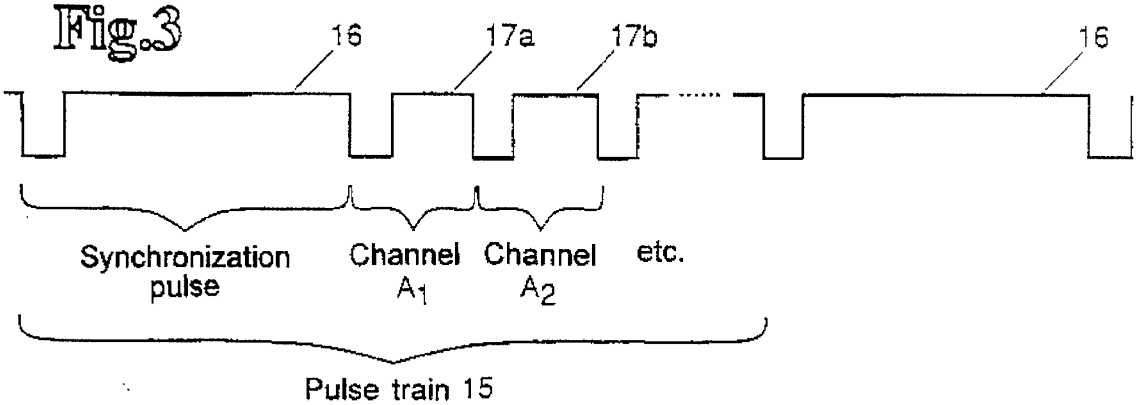
FIG. 3 shows a pulse train whose pulses correspond to different transmission time channels.

The mode of operation of the electrical circuit arrangement according to the invention is to be explained in principle by way of example with the aid of FIGS. 2 and 3.

The multiplex channel generator 4 arranged in the central unit 1 generates at periodic time intervals a pulse train 15 shown in FIG. 3. This pulse train 15 is composed of a synchronization pulse 16 and a sequence of at least two channel pulses 17*a*, 17*b*, . . . , of which in the exemplary embodiment shown here in each case one channel pulse 17*a*, 17*b*, . . . is respectively assigned to one of the local transmitting units 2 connected to the central unit 1. Typical temporal orders of magnitude are 8 milliseconds (=ms) for the synchronization pulse 16 and respectively 1 ms for a channel pulse 17*a*, 17*b*, . . . , thus producing, for example, for a 32-channel system a temporal length of the pulse train 15 having a typical order of magnitude of 40 ms.

The pulse trains 15 succeeding one another are transmitted via the multiplex two-wire line 3 to the individual local transmitting units 2. In this case, a detector circuit 9 arranged in each local transmitting unit 2 opens the time window, assigned to the respective local transmitting unit 2, for the corresponding channel pulse, that is to say the detector circuit 9 arranged in the first local transmitting unit 2 opens the time window for the channel pulse 17*a*, the detector circuit 9 arranged in the second local transmitting unit 2 opens the time window for the channel pulse 17*b*, etc. Before this happens, the contents of the counter 10, which is arranged in each local transmitting unit 2, is increased by one by the synchronization pulse 16, which is contained exactly once in each pulse train 15. If, for example, eight pulse trains 15 are passed, the counter 10 sends to the digital/analog (D/A) converter 11 a digital signal which corresponds to a sequence of the bit strings assigned to the decimal numbers 0 to 7. The D/A converter 11 converts this digital signal into a corresponding analog signal which is designated as reference value UR. The differential value $UD_k$ between the, for example, analog, measuring signal $UM_k$ supplied to the local transmitting unit 2 and the reference value UR is determined in the comparator 12, the index k designating the k-th local transmitting unit 2. If the differential value $UD_k$ is positive, that is to say the local measuring signal $UM_k$ overshoots the reference value UR, a trigger 13 connected downstream of the comparator 12 switches through, and this corresponds to a binary signal value "1", whereas the trigger 13 blocks (binary signal value "0") in the case of a non-positive differential value $UD_k \leqq 0$. The trigger 13 therefore serves to digitize the analog differential value $UD_k$, each of the binary signals generated in it being transmitted as channel pulse by the multiplex transmitter 14 on the channel $A_k$ to the multiplex receiver 5 arranged in the central unit 1. This multiplex receiver 5 is set up for multichannel operation, since it successively receives the respective binary signal as channel pulse from all n local transmitting units 2. The control required for this successive run is guaranteed in this case by the multiplex channel generator 4, which releases the corresponding channel $A_k$ for the binary signal arriving from the k-th local transmitting unit 2, that is to say all n local transmitting units 2 are interrogated one after another for the respective binary signal and the latter is respectively received by the multichannel multiplex receiver 5. The further evaluation of the respective binary signal is then performed separately, that is to say in a channel-specific fashion in the counters 6, which are assigned to the evaluation unit 7. If necessary, the evaluation unit 7 is followed by the display unit 8 which displays the data evaluated by means of the counter 6 and evaluation unit 7 in a suitable form.

Figure 4:
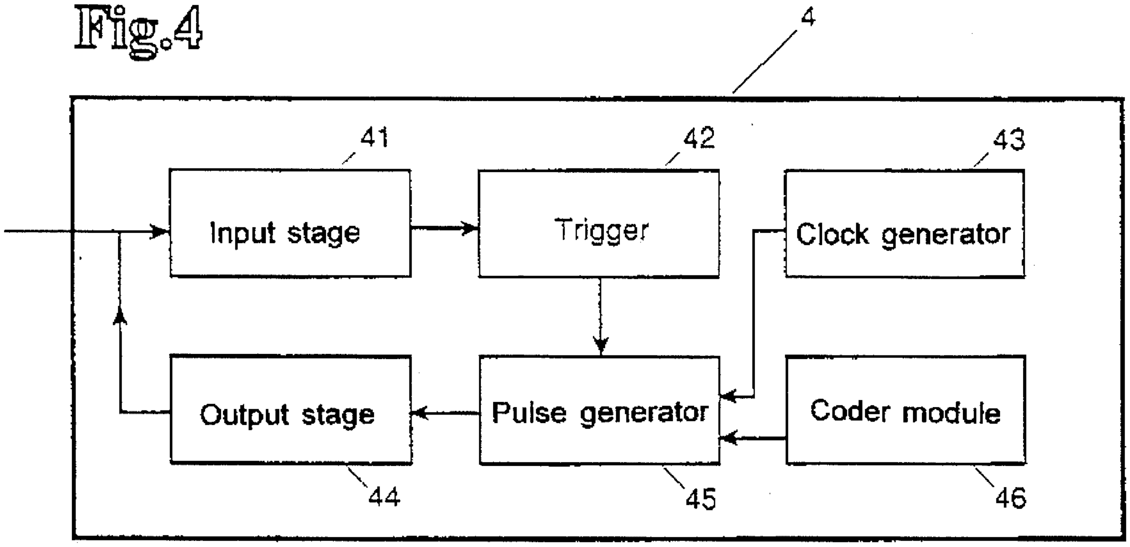
FIG. 4 shows a block diagram of a multiplex channel generator.

FIG. 4 shows for the multiplex channel generator 4 an exemplary embodiment which comprises an input stage 41, a trigger 42, a clock generator 43, an output stage 44, a pulse generator 45 and a coder module 46. The tasks of the multiplex channel generator 4 include in this case impressing a digital pulse code onto the multiplex two-wire line 3 and thus controlling the entire electrical circuit arrangement by clocking each individual module of the electrical circuit arrangement. At the same time, the multiplex channel generator 4 also serves, however, as power supply unit of the multiplex transmitter 14 if the latter should have no dedicated power supply.

The coder module 46 can be used to code the multiplex channel generator 4 for the generation of, for example, 8, 16, 32, 64 or 128 channels. In this case, the input stage 41 detects whether the channel whose time window is presently open is activated by the multiplex transmitter 14. Should this be the case, the signal of the trigger 42 to the pulse generator 45 changes the pulse shape for the relevant, that is to say the activated channel.

Figure 5:
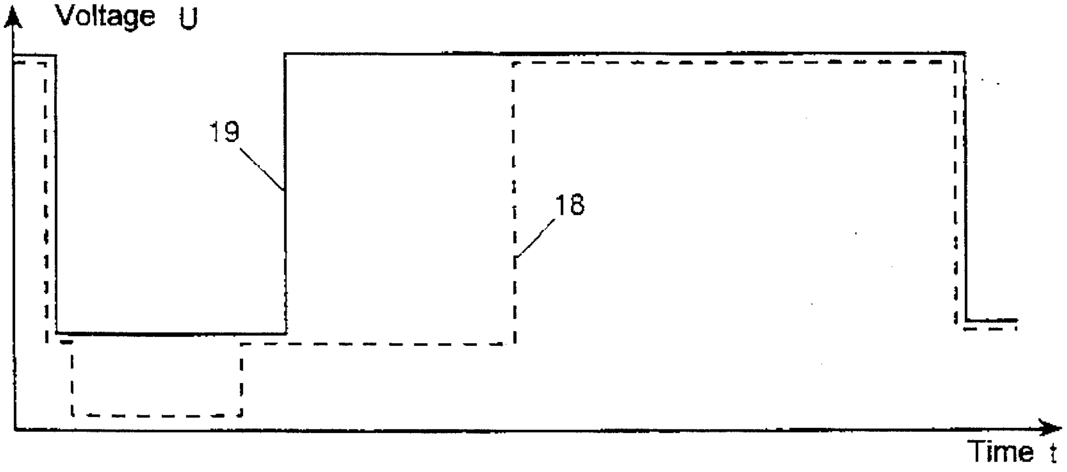
FIG. 5 shows a section of a pulse train.

FIG. 5 shows in this case in an exemplary fashion a comparison of these two possible pulse shapes:

Whereas the dashed line represents the pulse shape 18 for a released and thus activated channel (=binary signal value "1"), the continuous line represents the pulse shape 19 for a blocked channel (=binary signal value "0"). A typical order of magnitude for the maximum pulse height is in this case $U_{max}$=8 volts, and the typical temporal length of such a channel pulse is, for example, 1 ms, as already mentioned above. In this case, the voltage signals are transmitted using the multiplex two-wire method at typical frequencies of the order of magnitude of 1 kilohertz.

The pulse generator 45 generates pulse trains 15, which are represented in an exemplary fashion in FIG. 3 and are synchronized by-means of the clock generator 43. The number of the channels respectively to be transmitted with these pulse trains 15 is fixed in this case, as mentioned above, by the coder module 46.

Figure 6:
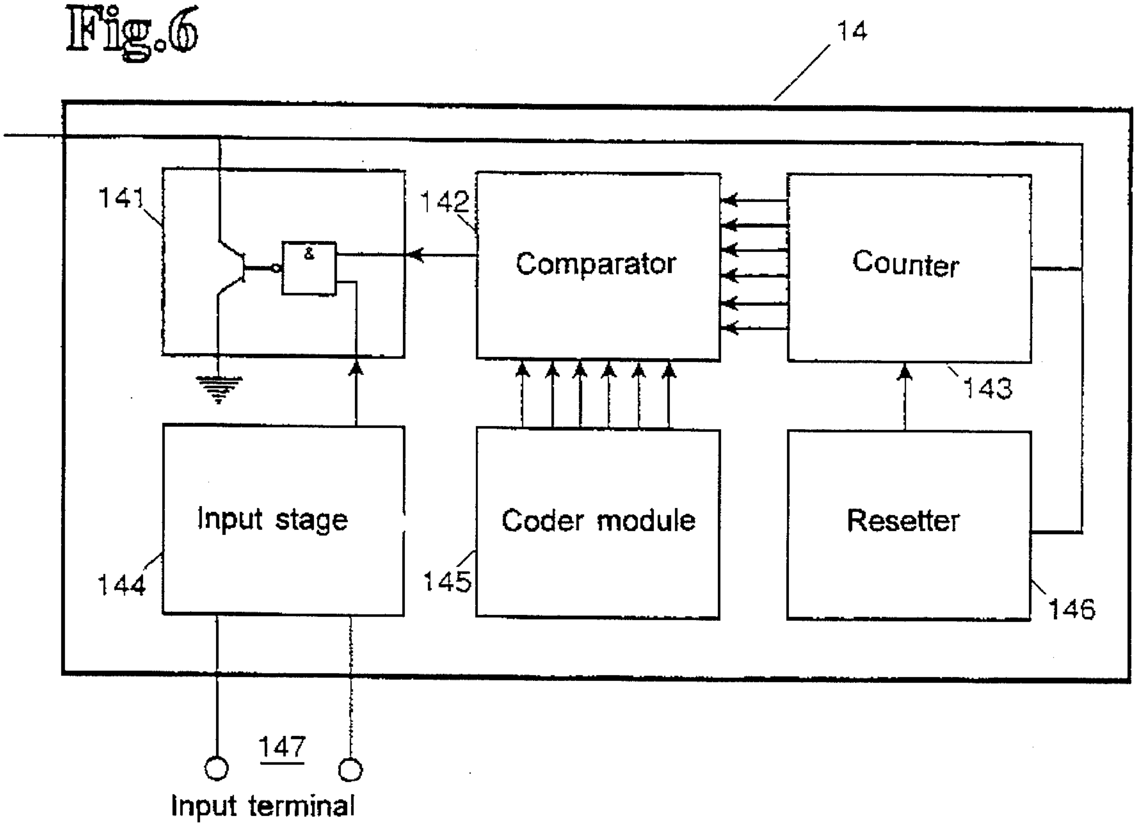
FIG. 6 shows a block diagram of a multiplex transmitter.

The output stage 44, which amplifies the signal and outputs it to the multiplex two-channel line 3, must be protected against shortcircuiting, since the multiplex transmitter 14 short-circuits the entire multiplex two-wire transmitting system for a period which amounts approximately to one sixth to one quarter of the temporal length of a channel pulse, in order to indicate thereby that the input stage 144 of the multiplex transmitter 14 shown in FIG. 6 is activated.

The abovementioned FIG. 6 shows an exemplary embodiment of the multiplex transmitter 14, which comprises an "AND" gate circuit 141 having two inputs, a comparator 142, a counter 143, an input stage 144, a code module 145, a resetter 146 and an input terminal 147, it being possible in this case to regard the comparator 142, the counter 143 and the coder module 145 together as decoder means.

The functional principle of the multiplex transmitter 14, which is connected in parallel in the multiplex two-wire arrangement, is based on the fact that at the moment at which the input stage 144 is detected as open, that is to say activated, or closed, the multiplex transmitter 14 sends a signal to the multiplex channel generator 4 which, in turn, changes its pulse code from "0" to "1". This is achieved in the following way:

The input stage 144 of the multiplex transmitter 14 is coded for a specific channel pulse by means of the coder module 145. The counter 143 serves to monitor the digital pulses which are output by the multiplex channel generator 4, the counter 143 being reset by the resetter 146 as soon as the synchronization pulse 16 is detected. The channel for which the multiplex transmitter 14 is coded is compared with the stored number of channel pulses 17*a*, 17*b*, . . . by means of the comparator 142. If theses-two parameters are of the same size, the comparator 142 sends a signal to one of the two inputs of the "AND" gate circuit 141. The other input of this "AND" gate circuit 141 is directly connected to the input stage 144 of the multiplex transmitter 14. If both inputs of the "AND" gate circuit 141 are activated, that is to say the output of the "AND" gate circuit 141 is at "high", the multiplex transmitter 14 short-circuits the entire multiplex wire transmitting system for a period which Mounts approximately to one sixth to one quarter of the temporal length of a channel pulse, whereupon the multiplex channel generator 4 is prompted to change its pulse code during the coded pulse time, this change being shown in an exemplary fashion in FIG. 5. If the input of the "AND" gate circuit 141 which is connected directly to the input stage 144 is not activated when its pulse code is reached, that is to say the output of the "AND" gate circuit 141 is at "low", the output goes into a waiting cycle until the input terminal 147 is reached by its fitting pulse code on the next occasion.

Figure 7:
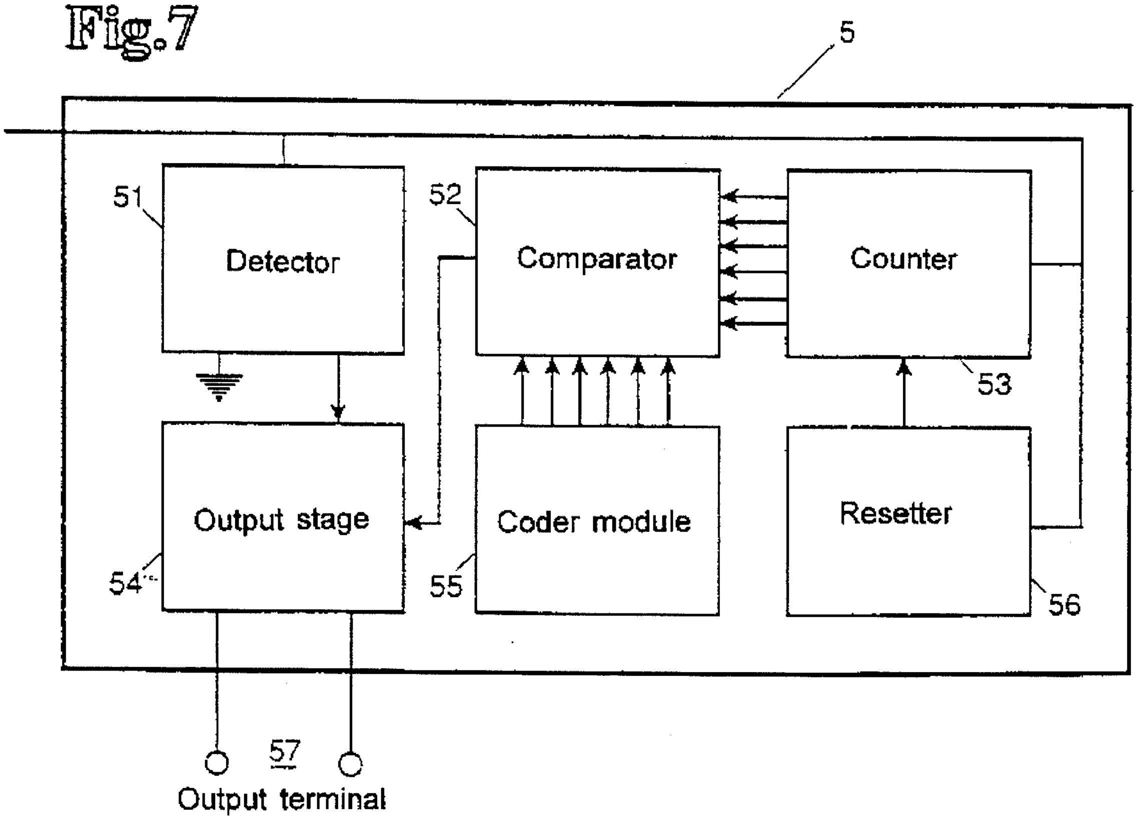
FIG. 7 shows a block diagram of a multiplex receiver.

FIG. 7 shows an exemplary embodiment of a multiplex receiver 5 which comprises a detector 51, a comparator 52, a counter 53, an output stage 54, a coder module 55, a resetter 56 and an output terminal 57, it being possible in this case to regard the comparator 52, the counter 53 and the coder module 55 together as decoder means. The functional principle of the multiplex receiver 5, which is connected in parallel in the multiplex two-wire arrangement, corresponds in this case analogously to the functional principle, explained above, of the multiplex transmitter 14.

The coder module 46 presented in FIG. 4, the coder module 145 presented in FIG. 6 and the coder module 55 presented in FIG. 7 can be constructed in this case as DIP switches (DIP=dual-in-line), as rotary switches or as EEPROM cells (EEPROM=electrically erasable programmable read only memory).

Figure 8:
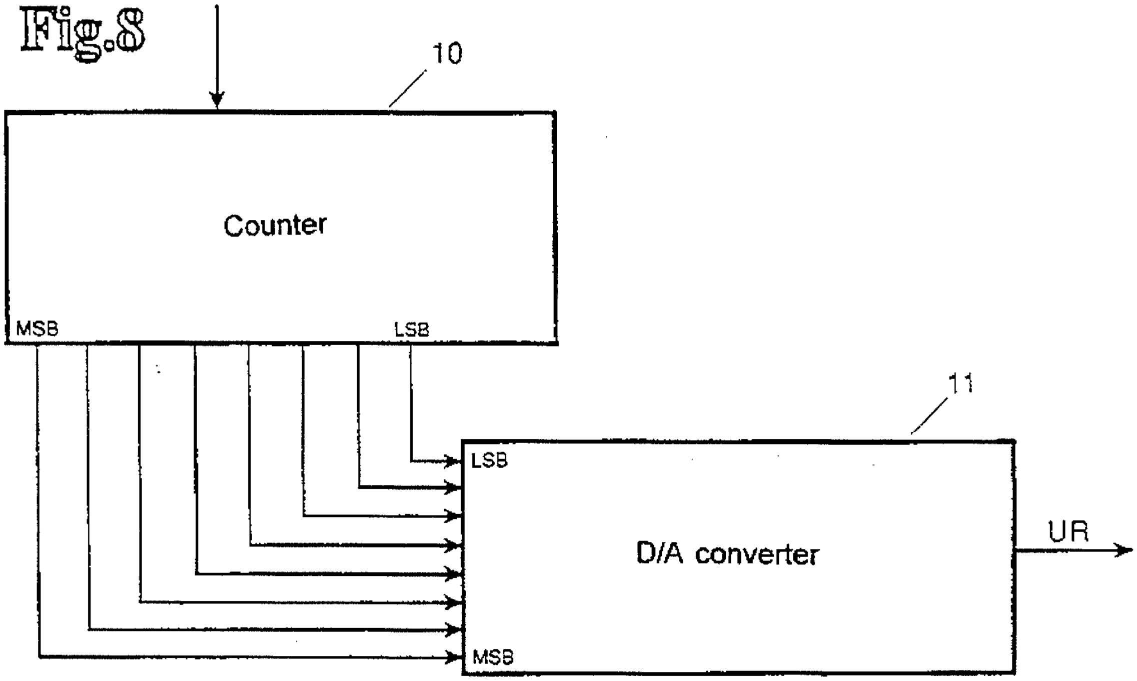
FIG. 8 shows an exemplary embodiment of a connection between a counter and a D/A converter in a local transmitting unit.
Figure 9:
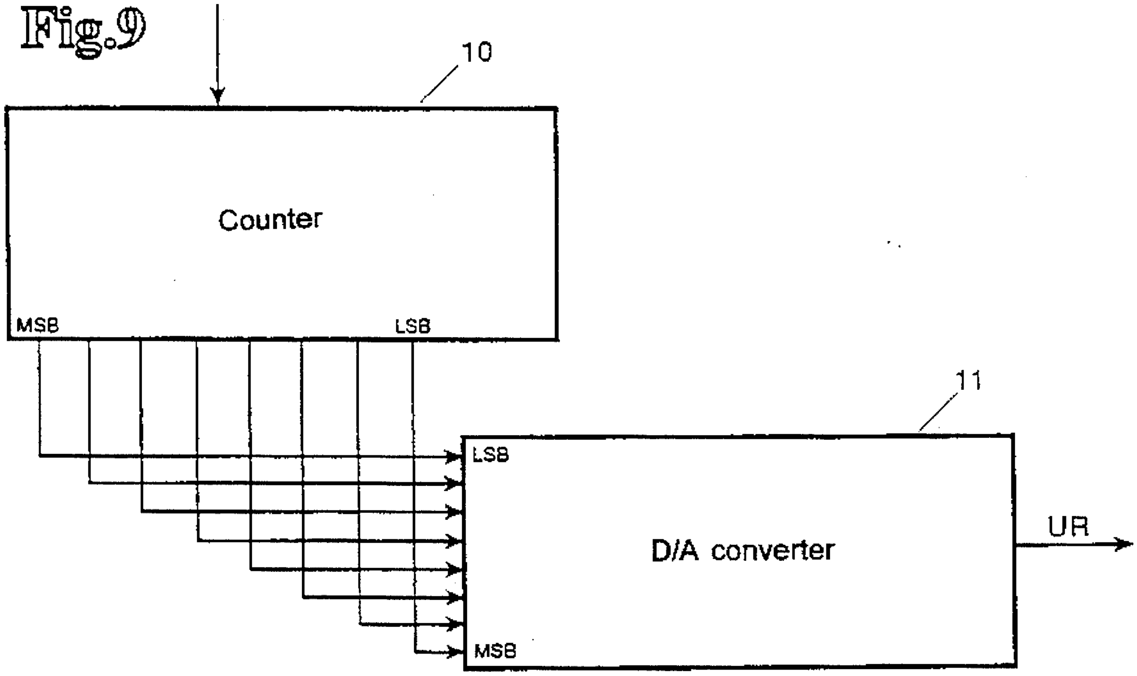
FIG. 9 shows an alternative exemplary embodiment of a connection between a counter and a D/A converter in a local transmitting unit.

FIGS. 8 and 9 show in the comparative fashion two possibilities for the connection between the counter 10 and the D/A converter 11 in a local transmitting unit 2. Presented respectively in FIG. 8 and in FIG. 9 are exemplary embodiments in which the counter 10 and the D/A converter 11 are connected to one another by an 8-bit line.

In this case,—as customary heretofore according to the prior art—in FIG. 8 the least significant bit (LSB) of the output terminal of the counter 10 is connected to the least significant bit (LSB) of the input terminal of the D/A converter 11, the second least significant bit of the output terminal of the counter 10 is connected to the second least significant bit of the input terminal of the D/A converter 11, etc. As mentioned above, the contents of the counter 10 is increased by one each time a synchronization pulse 16 reaches the counter 10, and in the case of the configuration shown in FIG. 8 this leads to a continuous rise in the signal values transmitted from the counter 10 to the D/A converter 11. The analog signal output by the D/A converter 11, which is designated as reference value UR, therefore has the characteristic pulse shape of a so-called "saw-tooth curve", that is to say a periodic, continuous and monotonically rising analog signal is obtained as reference signal UR.

By comparison with FIG. 8, in FIG. 9 all the terminals have been interchanged with one another, that is to say the output terminal of the counter 10 for the least significant bit (LSB) is connected to the input terminal of the D/A converter 11 for the most significant bit (MSB), the output terminal of the counter 10 for the second least significant bit is connected to the input terminal of the D/A converter 11 for the second most significant bit etc. As explained below, this measure produces a decidedly advantageous variation of the pulse shape of the analog reference signal UR:

If, for the sake of simplicity, it is assumed there is only one 3-bit line (not represented in the figures) between the counter 10 and the D/A converter 11, the following contents of the counter 10 results in the case of the connection, sketched in FIG. 8, between the counter 10 and D/A converter 11 after the accumulation of, for example, eight synchronization pulses 16:

| Bit string | associated decimal number |
|---|---|
| 0 0 0 | 0 |
| 0 0 1 | 1 |
| 0 1 0 | 2 |
| 0 1 1 | 3 |
| 1 0 0 | 4 |
| 1 0 1 | 5 |
| 1 1 0 | 6 |
| 1 1 1 | 7 |

The continuous rise, described above, in the contents of the counter 10 by one, which is also relayed exactly so to the D/A converter 11 via the connection, shown in FIG. 8, between the counter 10 and the D/A converter 11 is reproduced in this case in the right-hand column.

By contrast herewith, the connection, shown in FIG. 9, between the counter 10 and the D/A converter 11 has the effect that each bit string is, as it were, reflected at its "middle axis", that is to say the least significant bit (LSB) at the output terminal of the counter 10 becomes the most significant bit (MSB) at the input terminal of the D/A converter 11, the second least significant bit at the output terminal of the counter 10 becomes the second most significant bit at the input terminal of the D/A converter 11, etc. The corresponding table therefore takes the following shape:

| Bit string | associated decimal number |
|---|---|
| 0 0 0 | 0 |
| 1 0 0 | 4 |
| 0 1 0 | 2 |
| 1 1 0 | 6 |
| 0 0 1 | 1 |
| 1 0 1 | 5 |
| 0 1 1 | 3 |
| 1 1 1 | 7 |

A stochastic fluctuation in the signal arriving at the input terminal of the D/A converter 11 is thus to be seen in the right-hand column of this table, with the result that the analog reference signal UR output by the D/A converter 11 does not have a continuous, for example monotonically rising shape, but rather, as desired, fluctuates arbitrarily in a stochastically uniform distribution.

The consequence of this is that during the pass of each pulse cycle all the local measured values are not only recorded, but also scanned in a uniform distribution, and this independently of where the scanning is started inside a pulse cycle. In this way, it is already possible using temporally short sequences or pulse cycles to achieve a satisfactory resolution of the local measured values, with the result that the interchange shown in FIG. 9 of all the respectively opposing terminals, which although very simple is nevertheless highly effective, of the counter 10 and D/A converter 11 not only, as set forth above, saves material and costs, but also entails the advantage of a palpable saving in time in conjunction with simultaneously substantially improved resolution of the local measuring signal.

We claim:

1. An electrical circuit arrangement having at least two local transmitting units (2) for receiving and coding local measuring signals and for transmitting the coded measuring signals to a central unit (1), which local transmitting units (2) respectively have a comparator (12) for comparing the local measuring signal with a reference value and triggering means (13) for generating a binary signal to be transmitted to the central unit (1), wherein a) the central unit (1)
  a1) has a multiplex channel generator (4) having
    a1.1) variation means for varying the reference value in each local transmitting unit (2),
    a1.2) addressing means for addressing each local transmitting unit (2) and
    a1.3) collector means for collecting the binary signals transmitted by the local transmitting units (2), and
  a2) multiplex receiving means (5, 6, 7, 9) for receiving and processing the binary signals transmitted by the local transmitting units (2), said multiplex channel generator (4) being coupled both to the multiplex receiving means (5, 6, 7, 8) and to the local transmitting units (2) via a multiplex two-wire line, and b) the local transmitting units (2) respectively have an address in the two-wire system and have
  b1) processing means (9, 10, 11) for detecting a command given by the central unit (1) to vary the reference value, fox carrying out this variation and for processing the reference value varied by the multiplex channel generator (4), and
  b2) multiplex transmitting means (14) for transmitting the binary signal generated by the triggering means (13) to the multiplex receiving means (5, 6, 7, 8) of the central unit (1).

2. The electrical circuit arrangement as claimed in claim 1 wherein the multiplex channel generator (4) has a clock generator (43) and a pulse generator (45).

3. The electrical circuit arrangement as claimed in claim 1 wherein the multiplex channel generator (4) generates a pulse train (15) whose pulses correspond to different transmitting time channels, and the multiplex transmitting means (14) and the multiplex receiving means (5, 6, 7, 8) have decoder means (52, 53, 55) by means of which they are activated during at least one transmitting time channel assigned to them.

4. The electrical circuit arrangement as claimed in claim 1 wherein the processing means (9, 10, 11) of the local transmitting units (2) have a detector circuit (9), a counter (10) and a digital/analog (D/A) converter (11).

5. The electrical circuit arrangement as claimed in claim 1 wherein the comparator (12) in the respective local transmitting unit (2) forms a respective differential value (UD) between the local measuring signal (UM) and the reference value (UR).

6. The electrical circuit arrangement as claimed in claim 5, wherein the triggering means (13) of the local transmitting units (2) switch through (that is to say signal value "1") or block (that is to say signal value "0") depending on the sign of the differential value (UD).

7. The electrical circuit arrangement as claimed in claim 1 wherein the local transmitting units (2) have a multiplex transmitter (14) which transmits the signal value "1" or "0" supplied by the triggering means (13) to the multiplex receiving means (5, 6, 7, 8) of the central unit (1).

8. The electrical circuit arrangement as claimed in claim 1 wherein the multiplex receiving means (5, 6, 7, 8) of the central unit (1) have a multichannel-multiplex receiver (5), at least two counters (6) and an evaluation circuit (7, 8), one counter (6) each being respectively assigned to a local transmitting unit (2).

9. The electrical circuit arrangement as claimed in claim 4 wherein the output terminal of the counter (10) for the least significant bit (LSB) is connected to the input terminal of the D/A converter (11) for the most significant bit (MSB) and the output terminal of the counter (10) for the second-least significant bit is connected to the input terminal of the D/A converter (11) for the second-most significant bit etc.

* * * * *